(12) United States Patent
Uusitalo et al.

(10) Patent No.: US 8,862,138 B2
(45) Date of Patent: Oct. 14, 2014

(54) FORECASTING OF DYNAMIC ENVIRONMENTAL PARAMETERS TO OPTIMIZE OPERATION OF A WIRELESS COMMUNICATION SYSTEM

(75) Inventors: Mikko Aleksi Uusitalo, Helsinki (FI); Ari Hottinen, Espoo (FI); Jaakko Tapani Peltonen, Espoo (FI); Joni Kristian Pajarinen, Vantaa (FI)

(73) Assignee: Nokia Corporation, Espoo (FI)

( * ) Notice: Subject to any disclaimer, the term of this patent is extended or adjusted under 35 U.S.C. 154(b) by 839 days.

(21) Appl. No.: 12/929,708

(22) Filed: Feb. 9, 2011

(65) Prior Publication Data

US 2012/0202538 A1 Aug. 9, 2012

(51) Int. Cl.
*H04B 17/00* (2006.01)
(52) U.S. Cl.
CPC ........ *H04B 17/0067* (2013.01); *H04B 17/0072* (2013.01); *H04B 17/0075* (2013.01); *H04B 17/0095* (2013.01); *H04B 17/005* (2013.01)
USPC ......... 455/446; 455/423; 455/456.1; 455/457

(58) Field of Classification Search
None
See application file for complete search history.

(56) References Cited

U.S. PATENT DOCUMENTS

| 8,467,821 | B1 * | 6/2013 | Noel et al. ..................... 455/522 |
| 2005/0143090 | A1 | 6/2005 | Dowling .................... 455/456.1 |
| 2007/0092012 | A1 | 4/2007 | Wilhelmsson et al. ....... 375/260 |

OTHER PUBLICATIONS

P. Poupart "Exploiting Structure to Efficiently Solve Large Scale Partially Observable Markov Decision Processes", A thesis submitted in conformity with the requirements for degree of Doctor of Philosophy Graduate Department of Computer Science, University of Toronto, 2005, 144 pgs.
L. Baum et al., "A Maximization Technique for Occurring in the Statistical Analysis of Probabilistic Functions of Markov Chains", The Annals of Mathematical Statistics, 1970, vol. 41, No. 1, 164-171.
J. Pajarinen et al., "Latent State Models of Primary User Behavior for Opportunistic Spectrum Access", 978-1-4255-5213-Apr. 9, 2009, IEEE pp. 1267-1271.
S. Prentice et al., "The Belief Roadmap: Efficient Planning in Belief Space by Factoring the Covariance", 2009, 15 pgs.
Q. Zhao et al., Decentralized Cognitive MAC for Opportunistic Spectrum Access in Ad Hoc Networks: A POMDP Framework, IEEE Journal on Selected Areas in Communications, vol. 25, No. 3, Apr. 2007, pp. 589-600.

(Continued)

*Primary Examiner* — Philip Sobutka
(74) *Attorney, Agent, or Firm* — Harrington & Smith (57) ABSTRACT

An aspect of the exemplary embodiments of this invention is a method that includes receiving information from a plurality of spatially distributed user devices, where the information includes at least observations of a radio environment of each user device. Based on the received information, the method creates a model of time evolution of a spatio-temporal map for a plurality of spatial locations. The method further includes creating a policy based on the model of time evolution of the spatio-temporal map, and transmitting the policy to the plurality of user devices. A further aspect of exemplary embodiments of this invention is a method that includes generating a probabilistic model based at least on observations of a radio environment of a user device; transmitting the probabilistic model to a network access node of a wireless communication network; receiving information from the network access node; and operating the user device at least in part based on the received information. Also described are apparatus and computer program products that operate in accordance with the methods.

19 Claims, 4 Drawing Sheets

(56) References Cited

OTHER PUBLICATIONS

P. Costa et al., "Socially-Aware Routing for Publish-Subscribe in Delay-Tolerant Mobile Ad Hoc Networks", IEEE Journal on Selected Areas in Communications, vol. 26, No. 5, Jun. 2008.

L. Rabiner et al., "An Introduction to Hidden Markov Models", IEEE ASSP Magazine Jan. 1986, 13 pgs.

International Search Report and Written Opinion issued for corresponding International patent Application No. PCT/FI2012/050034 mailed on May 14, 2012.

* cited by examiner

FORECASTING OF DYNAMIC ENVIRONMENTAL PARAMETERS TO OPTIMIZE OPERATION OF A WIRELESS COMMUNICATION SYSTEM

TECHNICAL FIELD

The exemplary and non-limiting embodiments of this invention relate generally to wireless communication systems, methods, apparatus, devices and computer programs and, more specifically, relate variously to interference maps, navigation, cognitive radio, location determination, databases, machine learning and forecasting, wireless access, as well as to techniques for achieving an optimization of connectivity between mobile radios and wireless network infrastructure.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

Cognitive radio is a technique for wireless communication in which either a network or a wireless node changes its transmission or reception parameters to communicate while avoiding interference with licensed and/or unlicensed users. The changes in parameters are based on active monitoring of the radio environment, such as the radio frequency spectrum, user behavior and the state of the wireless network.

One publication of interest is: Joni Pajarinen, Jaakko Peltonen, Mikko A. Uusitalo, and Ari Hottinen, Latent state models of primary user behavior for opportunistic spectrum access, In Proceedings of IEEE International Symposium on Personal, Indoor and Mobile Radio Communications, Tokyo, Japan, September 2009. The authors state that as there is a limited amount of radio spectrum, more efficient use of the spectrum is important to avoid congestion. Congestion is partly due to rigid resource allocation in many wireless systems. Cognitive radio systems aim to increase spectrum efficiency by opportunistic spectrum use: they adapt to the radio environment and learn to exploit underutilized radio channels for their own communication while protecting primary users (existing devices on the channels).

Satellite navigation systems, which are available in so-called smartphones, are well-known applications which can be used to calculate routes and schedules for a mobile user. Based on such information the future location of such a smartphone device can be predicted in an accurate and reliable manner.

SUMMARY

The foregoing and other problems are overcome, and other advantages are realized, by the use of the exemplary embodiments of this invention.

In a first aspect thereof the exemplary embodiments of this invention provide a method that comprises receiving information from a plurality of spatially distributed user devices, the information derived at least from observations of an environment of each user device; based on the received information, creating a model of time evolution of a spatio-temporal map for a plurality of spatial locations; creating a policy based on the model of time evolution of the spatio-temporal map; and transmitting the policy to the plurality of user devices.

In another aspect thereof the exemplary embodiments of this invention provide an apparatus that comprises at least one processor and at least one memory including computer program code. The memory and computer program code are configured, with the at least one processor, to cause the apparatus at least to receive information from a plurality of spatially distributed user devices, the information derived at least from observations of an environment of each user device; to create, based on the received information, a model of time evolution of a spatio-temporal map for a plurality of spatial locations; to create a policy based on the model of time evolution of the spatio-temporal map; and to transmit the policy to the plurality of user devices.

In another aspect thereof the exemplary embodiments of this invention provide a method that comprises generating a probabilistic model based at least on information derived from observations of an environment of a user device; transmitting the probabilistic model to a network access node of a wireless communication network; receiving information from the network access node; and operating the user device at least in part based on the received information.

In a still further aspect thereof the exemplary embodiments of this invention provide an apparatus that comprises at least one processor and at least one memory including computer program code. The memory and computer program code are configured, with the at least one processor, to cause the apparatus at least to generate a probabilistic model based at least on information derived from observations of an environment of a user device; transmit the probabilistic model to a network access node of a wireless communication network; receive information from the network access node; and operate the user device at least in part based on the received information.

DETAILED DESCRIPTION

Figure 1:
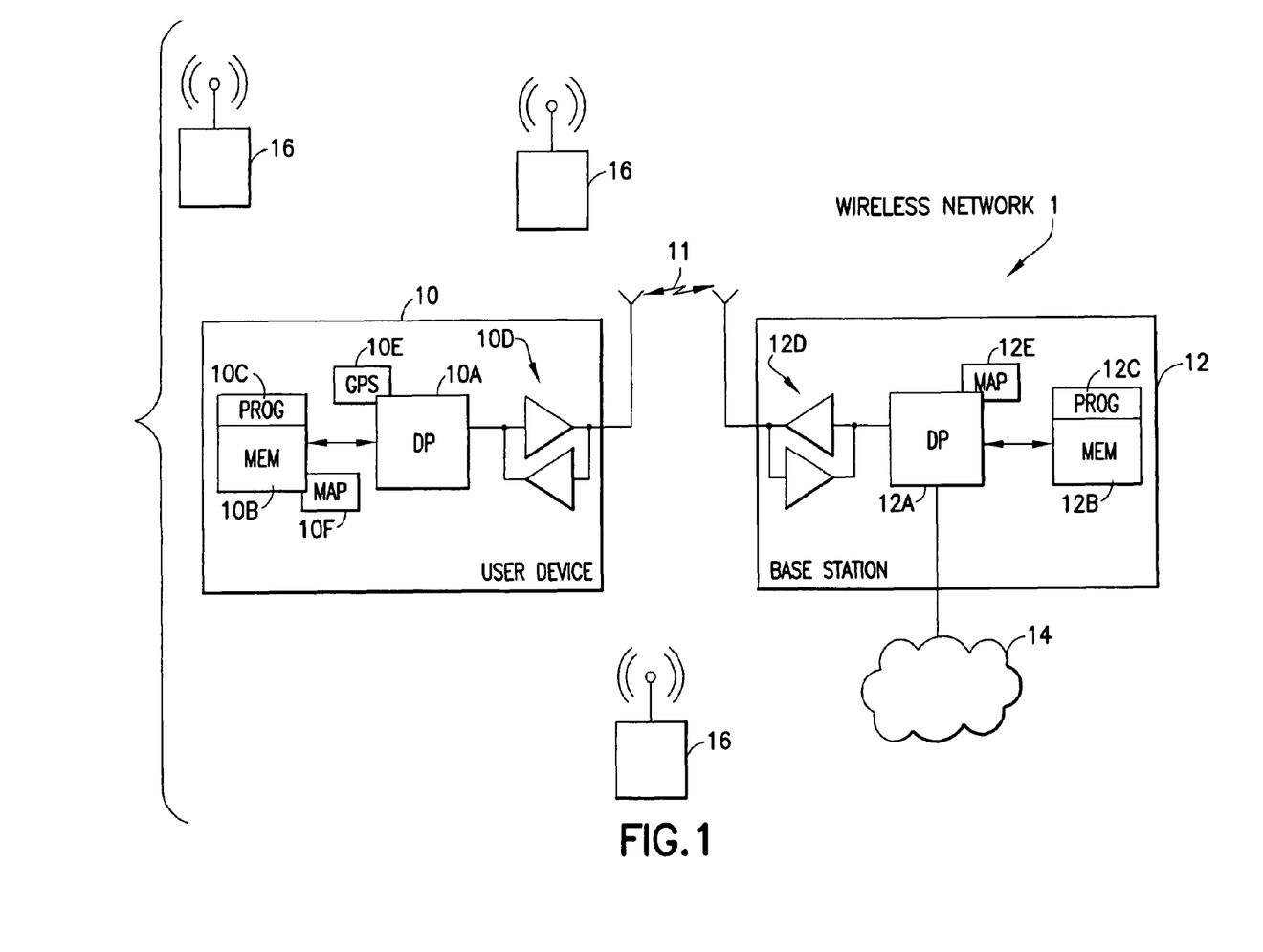
FIG. 1 shows a simplified block diagram of various electronic devices that are suitable for use in practicing the exemplary embodiments of this invention.

FIG. 1 illustrates a non-limiting embodiment of apparatus that can be used to implement the exemplary embodiments of this invention. In FIG. 1 a wireless network 1 is adapted for communication over a wireless link 11 with an apparatus, such as a mobile communication device which may be referred to as a cognitive radio, or as a cognitive device, or simply as a user device 10, via a wireless network access node referred to for convenience herein, and not by way of limitation, as a base station 12. The base station 12 can provide, via one or more additional wireless network components, connectivity with further networks such as a telephone network and/or a data communications network (e.g., the internet). The user device 10 includes a controller, such as at least one computer or a data processor (DP) 10A, at least one non-transitory computer-readable memory medium embodied as a memory (MEM) 10B that stores a program of computer instructions (PROG) 10C, and at least one radio frequency (RF) transmitter and receiver pair, or transceiver 10D for bidirectional wireless communications with the base station 12 via one or more antennas. The base station 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the user device 10 via one or more antennas. The base station 12 can be connected directly or indirectly to other systems/networks via one or more wide area, local area and/or radio communication networks, shown generically as the network 14 in FIG. 1.

In the radio environment of the user device 10 are typically found other devices 16 capable of transmitting radio signals in licensed or unlicensed radio bands. These other devices 16 can be, as non-limiting examples, other user devices 10 such as cellular phones, personal digital assistants (PDAs), computers, wireless modems and tablet-based computing devices, and other base stations such as macro base stations (e.g., cellular base stations) and/or smaller base stations (e.g., personal base stations, residential base stations) such as femto stations and pico stations. Some of the other devices 16 can be other user devices 10 served by the same base station 12 or by other base stations. The radio transmissions from these other devices 16 can potentially interfere with the radio transmission and reception of the user device 10.

For the purposes of describing the exemplary embodiments the various hardware and software of the user device 10 may be considered to cause the user device 10 to operate and function as a cognitive radio.

For the purposes of describing the exemplary embodiments of this invention the user device 10 may be assumed to also include some type of location determining system, such as a global positioning satellite (GPS) receiver 10E.

At least one of the programs 10C and 12C is assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the data processor 10A of the user device 10 and/or by the data processor 12A of the base station 12, or by hardware, or by a combination of software and hardware (and firmware).

In general, the various embodiments of the user device 10 can include, but are not limited to, cellular telephones, PDAs having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. The user device 10 can in some embodiments be considered as a smartphone.

The computer-readable memories 10B and 12B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A and 12A may be of any type suitable to the local technical environment, and may include one or more of general purpose computers, special purpose computers, microprocessors, digital signal processors (DSPs) and processors based on multi-core processor architectures, as non-limiting examples.

During operation of the user device 10 it is possible to collect information on environmental parameters such as radio interference levels and other radio parameters. This can be accomplished at several scales of detail with several spatial and temporal resolutions. During operation of the user device 10 it is also possible to collect information on the movement of people, vehicles and other objects of interest. The result can be represented as a map 10F, which can be referred to as a local map, representing these parameters with respect to spatial location and temporal location (time points from the past to the present, and unobserved values into the future). The map 10F can be embodied as one or more data structures stored in the memory 10B of the user device 10. Different network operators may have different parameters (such as different radio interference levels at each time and spatial location) and may thus find it desirable to build their own maps of the parameters. One such map is shown as map 12E stored at the base station 12, although the map can also be stored and maintained elsewhere in the wireless network infrastructure. The map 12E may be referred to as a spatio-temporal map. Future development of the measured parameters can be forecast with machine learning (e.g., creating a probability model of the evolution of the map into the future) and used for optimizing connectivity and/or routes.

In general, information generated by the user device 10 and sent to the base station 12 can comprise information that is derived from observations of an environment of the user device 10. The observations can be of, but are not limited to, a radio environment of the user device 10.

During route finding it is possible to determine a best route from the point of view of connectivity and interference avoidance (for example, to find a walking route from point A to point B so that interference along each point of the entire route is minimal). During route finding one can also determine a best route from point A to point B so as to avoid meeting a certain person or persons or encountering some object. During route finding one can also determine a best route from point A to point B so as to ensure meeting a certain person or persons or encountering an object.

With respect to route finding more quantities/parameters other than radio parameters may be needed. For example, it can be beneficial to also consider at least the locations of the persons or objects of interest, or observations of their locations (with varying degrees of reliability), would then need to be transmitted. Such observations could then be used in path-finding to create penalties for being too far from, or too close to, a person or object of interest, depending on whether the goal is to avoid or ensure meeting such a person or object. As such, the user device 10 can also observe any other quantities (parameters) for which suitable sensors (e.g., the GPS 10E and/or a camera) are available. Other techniques for observing parameters of interest, including interactive input from the user, can also be used in accordance with the exemplary embodiments. In this regard the parameters of interest can include the motion of people or the motion of vehicles, as non-limiting examples.

Interference prediction can be employed for various purposes. For example, interference prediction can be used to vary the price of the use of the radio spectrum at different locations and at different times, assuming that such a price variability is permitted by regulation (e.g., that a spectrum auction is permitted). Further by example, interference prediction can be used to change the cost of connectivity to match the service level and/or to guide traffic to optimal connectivity routes. Further by example, interference prediction can be used to reposition a movable base station or other links (e.g., airborne links) to optimize connectivity provisioning. Further by example, interference prediction can be used to change the power output of the base station 12 to optimize connectivity, as well as to select a correct method for achieving connectivity between the user device 10 and the base station 12.

During operation certain information can be collected and stored to separate or joint databases in a centralized manner, or the information can be collected and stored locally. Analysis of the collected information can be accomplished as described below. The end results of the analysis can be fed back to all devices that would benefit from the analysis.

Figure 2:
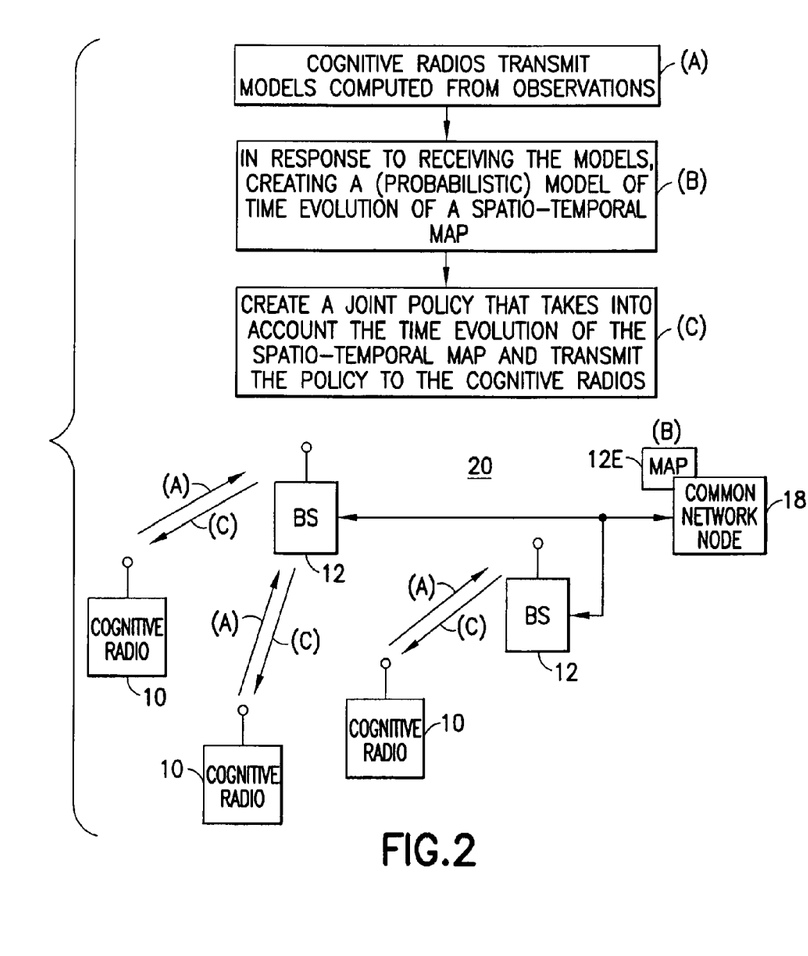
FIG. 2 depicts a system and method to compute policies for cognitive radios based on a computed probabilistic parametric model represented as a spatio-temporal map.

Provided now with reference to FIG. 2 is an example overview of a system 20 that computes policies for cognitive radios, such as the user device 10, based on a computed probabilistic parametric model (the spatio-temporal map 12E). This can be achieved during execution of a multi-step process.

In a first step (A) cognitive radios 10 transmit to the base station (BS) 12 or to multiple base stations 12 models computed from observations. Examples of such models, which can be Markov models as discussed below, can include, but are not limited to, one or more of an interference model, a transmission model, a model for observed communication traffic prices. The cognitive radios 10 can also transmit a current direction of movement, a model for a future direction of movement, as well as information concerning a planned travel goal.

In a second step (B), and in response to receiving the models, the base station 12 or some other centrally located node or nodes connected with the base station 12, shown as a common network node 18 in FIG. 2, creates a (probabilistic) model of time evolution of the spatio-temporal map 12E. This model includes knowledge about the uncertainty of the map 12E, and can be used for predicting the values of parameters at some time in the future.

Figure 3:
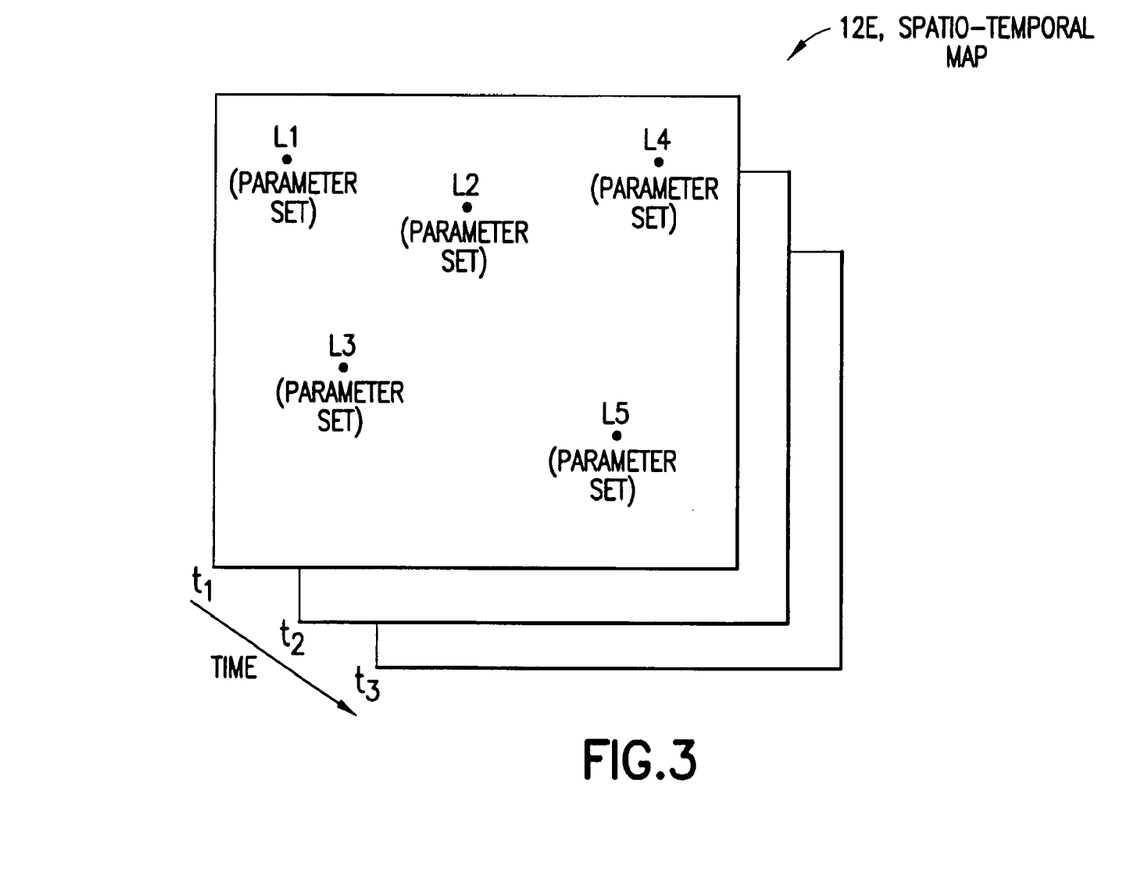
FIG. 3 is a representation of the spatio-temporal map shown in FIG. 2.

FIG. 3 is a representation of the spatio-temporal map 12E shown in FIG. 2. The spatio-temporal map 12E can embody data representing a plurality of spatial locations (L1, L2, etc.) each having an associated parameter set each containing one or more parameters of interest. The parameter set for a given location can include, for example, an interference level and/or a connection cost reported by the various spatially-distributed cognitive radios 10 in the first step (A) above. The spatio-temporal map 12E also has a time extent (e.g., represented by times t1, t2, t3, etc.) containing predicted parameter set values as they evolve into the future.

In a third step (C) the various base stations 12, or the common network node 18, or the base stations 12 in cooperation with the common network node 18, create a joint policy that takes into account the time evolution of the spatio-temporal map 12E for the cognitive radios 10, and the policy is then transmitted to the cognitive radios 10. This policy can be optimized so as to, for example, reward with a positive value in the function to be optimized for reducing interference to cognitive radios now and in the future, penalize with a negative value for meeting unwanted persons or objects (or places), or reward for meeting wanted persons or objects (or places).

As will be discussed in further detail below with regard to pathfinding, a particular path can be found by optimizing a function by finding the maximum value for the function. The reward implies positive values being allocated to the function and the penalty implies negative values being allocated.

The evolution of the parameters (parameters sets of FIG. 3) into the future can be described by a probabilistic model, for example as a Markov model describing transition probabilities, for each parameter at each spatial location, from a value at time t to a value at time t+1. The evolution of the parameters into the future can also be accomplished using any suitable, more complex probabilistic model.

Parameters that can be predicted to exist at some certain location at some certain time can include, but are not limited to, the level of interference, price offered by different operators and navigation-related parameters. While interference and price are given as exemplary specific examples the method can be applied as well for the estimation of other parameters.

Described now is the construction the parametric spatio-temporal map 12E.

As in the first step of FIG. 2, each radio (user) device 10 creates and updates a probabilistic model at its current location. For example, a hidden Markov model (HMM) describes the probability for moving from one state to another, and the probability for observing a certain observation, when in a certain state. The HMM can be constructed by, for example, gathering a time series of observations and then applying the well known Baum-Welch algorithm to estimate the HMM parameters.

The Baum-Welch algorithm (L. E. Baum, T. Petrie, G. Soules, and N. Weiss, "A maximization technique occurring in the statistical analysis of probabilistic functions of Markov chains", Aim. Math. Statist., vol. 41, no. 1, pp. 164B171, 1970) is used to find the unknown parameters of a HMM. It makes use of a forward-backward algorithm. The Baum-Welch algorithm is a particular case of a generalized expectation-maximization (GEM) algorithm. It can compute maximum likelihood estimates and posterior mode estimates for the parameters (transition and emission probabilities) of an HMM, when given only emissions as training data. The Baum-Welch algorithm has two steps: (1) calculating the forward probability and the backward probability for each HMM state; and (2) on the basis of this calculation determining the frequency of the transition-emission pair values and dividing by the probability of the entire string. This amounts to calculating the expected count of the particular transition-emission pair. Each time a particular transition is found, the value of the quotient of the transition divided by the probability of the entire string increase, and this value can then be made the new value of the transition.

Reference in this regard can also be made to L. R. Rabiner and B. H. Huang, "An Introduction to Hidden Markov Models", IEEE ASSP Magazine, vol. 3, number 1, pgs. 4-16, January 1986.

In the exemplary embodiments of this invention the observations that are used to construct the HMM can be, for example, interference levels or spectrum frequency prices.

In addition to the current interference level or price the states of the HMM also define what the future will most likely be for possible combinations of future observations.

Each radio device 10 can also create and update a hidden Markov model of its own packet transmissions. As network traffic is bursty a Markov model with several states is an appropriate model for network traffic.

Each radio device 10 can also communicate its planned traveling destination, if known, to the base station 12.

The radio devices 10 communicate the Markov models to the base stations 12 and the base stations 12 (or some centrally located node or nodes connected with the base stations 12) combine the models into a single model. This corresponds to step 2 of FIG. 2.

The HMMs can be combined into a single large probabilistic model (model 12E) that predicts the future values of the parameters at various locations. As an example, a probability distribution, belief, can be maintained over world states. The HMMs received from the radio devices 10 can be used to compute how the probability distribution over parameter states changes given the observations of the surrounding world. For the case where the parameters are radio device transmission states the transmission state of each radio device 10 can be, as three non-limiting examples, "transmission", "idle", or "collision". For an interference parameter the states define the level of the interference. Also for example price parameters can be used.

In order to compute parameters at time step t at a certain spatial location the following can be performed. As an approximation one can simulate the Markov model of each radio device 10 for t time steps by taking into account only the most likely observations. This yields the probability distribution over all states at time step t. From this distribution the most likely parameter values at the certain spatial location can be computed. For the case of radio transmissions the states that are in the "transmission" state can be assumed to contribute to the level of interference. In addition the environmental interference (environmental interference HMMs can be simulated similarly to the radio transmission HMMs) contributes to the overall level of interference.

In order to combine the models from the separate user devices 10 into a unified estimate of the probability distribution over all states at time step t, one or several computational inference techniques of varying sophistication can be used. One relatively simple technique is to simulate the Markov model of each radio device 10 for t time steps, and apply a standard estimation technique to the data (variable values) of all devices recorded during the simulation. Note that the individual devices 10 included in the simulation will react to each other's actions and the changes that such actions make to the environment. For example, if one device 10 chooses an action during the simulation that interferes with another device 10, this can then influence the observation received by the other device in the same time step or at a future time step. In this case the combined model estimated from this simulation can take into account interactions between devices. In order to reduce computational complexity of such a simulation, one can take into account only the most likely observations for each device 10 at each time step.

As an interference example, consider the interference at each spatial location and time step to be a sum of the environmental interference (e.g., interference caused by one or more of the other devices 16 of FIG. 1 and/or by natural phenomena, other than the radio devices 10 that are part of the system) and the interference caused by the radio devices 10 themselves.

As a price example, consider that each radio device 10 observes the price for spectrum at its current spatial location and forms a model over time that is descriptive of price changes and communicates this model to the base station(s) 12.

The predicted travel goals and paths of the cognitive radios 10 can be taken into account while forming the parametric spatio-temporal map 12E thereby enhancing the overall accuracy of the spatio-temporal map 12E.

Described now are non-limiting examples of the uses of the spatio-temporal map 12E.

In one example the base stations 12 can predict locations of external interference sources, such as radios which are not part of the system 1, using the interference map and the interference observations of the cognitive radios 10. For example the most likely locations of interference sources can be triangulated from the predicted interference observations in the future.

In another example those base stations 12 that are capable of movement can move to locations on the spatio-temporal map 12E that are predicted to best suitable in the future. For example it may be advantageous to move a certain base station 12 to a location where the interference is predicted to increase in order to make communications possible at that location. This problem can be solved by considering it to be a partially observable Markov decision process (POMDP) problem such as: consider moving the base station 12 as an action of an agent (the agent follows a policy which is optimized by the POMDP), assign rewards to minimizing interference to users, and use the HMMs as the probabilistic model in the POMDP.

Reference with regard to the partially observable Markov decision process (POMDP) can be made to, for example, the above referenced Joni Pajarinen, Jaakko Peltonen, Mikko A. Uusitalo, and Ari Hottinen, "Latent state models of primary user behavior for opportunistic spectrum access," In Proceedings of IEEE International Symposium on Personal, Indoor and Mobile Radio Communications, Tokyo, Japan, September 2009, as well as to Q. Zhao, L. Tong, A. Swami, and Y. Chen, "Decentralized cognitive MAC for opportunistic spectrum access in ad hoc networks: A POMDP framework," IEEE J. Sel. Areas Commun., vol. 25, no. 3, pp. 589B600, April 2007. As is stated in Pajarinen et al. in POMDP learning a secondary user (SU) optimizes its action policy based on a Markov model that comprises the possible states and transition probabilities. As a Markov model only approximates real channel behavior; such models are used as a simplification allowing intuitive and computationally feasible optimization of action policies. The better the model matches real channel behavior, the better the optimized policy performs in reality. Typical POMDP solutions to opportunistic spectrum access use simple two-state channel models: a channel is idle or has a primary user (PU) transmitting, and transition probabilities between these two states depend only on the previous state; an action incurs a penalty if the SU transmits at the same time as the PU. A discrete POMDP (e.g., see P. Poupart, "Exploiting structure to efficiently solve large scale partially observable Markov decision processes", Ph.D. thesis, University of Toronto, Toronto, Canada, 2005) consists of a finite set of states S, actions A, observations O, transition probabilities $P(s'|s, a)$, observation probabilities $P(o|s', a)$, and rewards $R(s, a)$.

In the exemplary embodiments of this invention the base stations 12 can compute a joint policy for the base stations 12 to choose the most suitable power levels at each future time step, while taking into account how the interference map is expected to evolve over time. For example, if the interference at a spatial location between two base stations 12 is expected to increase in the future, then both base stations 12 can use the agreed on policy to increase their respective power levels, which they can do without communicating with each other.

This approach can thus substantially decrease the amount of communication between base stations, as each can act semi-autonomously based on the respective understanding of the joint policy.

In the exemplary embodiments of this invention the spatio-temporal map 12E can be formed as a price map. For example, a certain business entity can inform a cognitive radio 10 how much it will cost to transmit at a current location and a current time. Each cognitive radio 10 forms a probabilistic model of the costs at its current location and communicates this model to a base station 12. The base station(s) 12 form the spatio-temporal map 12E that can be used to predict prices at various spatial locations. These predictions can then be used to guide a cognitive radio 10 from a current location to a less expensive location.

Businesses locations can use the predictions of the spatio-temporal map 12E to dynamically assign costs or prices to spatial locations. For example, by having knowledge of how many cognitive radio users are predicted to be at a certain location, and how much resulting interference there will be, the businesses can assign costs to transmissions according to their business model.

In the exemplary embodiments of this invention the spatio-temporal map 12E can be used to determine an optimum method of connectivity. For example, if the spatio-temporal map 12E is estimated based on, for example, multiple frequencies, then cognitive radios 10 can use the predictions of the map 12E to offload communication to other than a currently used frequency and/or to load balance communications amongst multiple frequencies. This can be advantageous as the level of interference can vary substantially between different frequencies.

As was discussed previously, the spatio-temporal map 12E can be used to model dynamic interference in addition to static interference. It is based on the observations made by the cognitive radios 10 in their respective local environments, and the local model 10F received from the cognitive radios 10 are combined into a global model. This enables taking into account various environmental factors such as traffic and weather conditions, as compared to the use of only a static interference model.

The exemplary embodiments of this invention also enable pathfinding while optimizing multiple objectives. The goals for a pathfinding task can be set mathematically. For example, one goal can be to minimize a length of time taken by a user of the device 10 to travel from point A to point B, and to minimize the interference experienced by the user device 10 at each step of the travel. These goals can be formed into rewards at each time step. For example, interference level is a penalty (negative reward), and distance from point B is also a penalty. It should be noted that the total reward or penalty for any action involves the 'goodness' of the action towards multiple goals (reaching the target, interference avoidance, and potential other goals of the user).

Given the model of parameter evolution, and a reward model for a pathfinding task, planning a good or optimum path for the user can be represented as a reinforcement learning task which can be solved by the partially observable Markov decision process (POMDP) model. At each time instant, based on known observations about the parameters (acquired in some locations over the map such as interference values measured at locations of user devices 10), the POMDP model estimates the current values of the parameters over the map as a probability distribution over the possible values. The POMDP model also selects a movement for the user device 10, which produces an immediate reward (or penalty) and also affects the future rewards (since, for example, moving the user device 10 further away from point B (the end point) could temporarily improve phone reception but increases the length of time taken to traverse the path).

During pathfinding the user of the user device 10 can be prompted via a user interface (e.g., visual display and/or speech synthesis) to follow a suggested path.

One publication of general interest for the path finding problem in an uncertain world is Samuel Prentice and Nicholas Roy. "The Belief Roadmap: Efficient Planning in Belief Space by Factoring the Covariance", In International Journal of Robotics Research, vol. 28, no. 11-12, pages 1448-1465, 2009.

The exemplary embodiments of this invention can employ the family of POMDP algorithms for the task of optimizing spatial navigation for goals that depend on the spatio-temporal radio environment which changes dynamically and locally over time. In this context certain modifications can be made to take into account the specific parameters that are measured over the spatio-temporal map 12E and the specific goals of the user devices 10. Thus, the existing family of POMDP methods, whose properties have been well characterized, can be modified to achieve pathfinding in a dynamically changing landscape of interference and other radio parameters, as opposed more conventional radio-related pathfinding based on assumptions of fixed interference levels at different locations over the path finding landscape, which do not change over time. In more detail: the time evolution of interference levels can be characterized using Markov models. A state of these Markov models would describe the actual interference level, but also the probabilities of trajectories the interference level could take in the future. A POMDP method could then be utilized to optimize the total reward over future time steps, when the state transition probabilities (=Markov models) of the interference levels are known. Using a more complex probabilistic model of the time evolution of the interference level would allow a POMDP method to achieve greater reward by predicting future interference levels only based on the current knowledge it has accumulated. When the interference levels are assumed static, the low interference opportunities are reduced and high interference situations cannot be accurately predicted.

Based on the foregoing it should be apparent that the exemplary embodiments of this invention provide a method, apparatus and computer program(s) to provide an enhanced user experience in terms of at least cost, speed, connectivity and providing an optimum route between two or more points.

Figure 4:
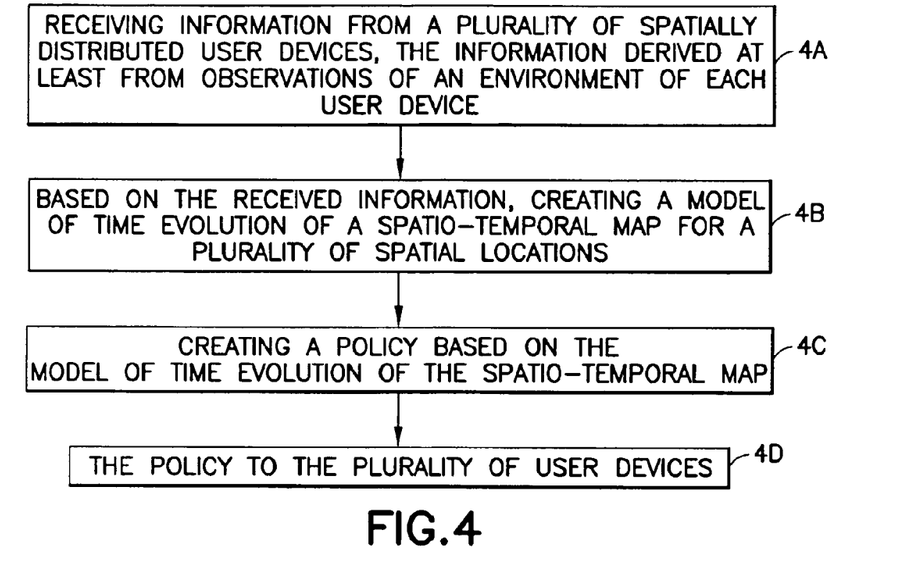
FIG. 4 is a logic flow diagram that illustrates the operation of a method, and a result of execution of computer program instructions embodied on a computer readable memory, in accordance with the exemplary embodiments of this invention.

FIG. 4 is a logic flow diagram that illustrates the operation of a method, and a result of execution of computer program instructions, in accordance with the exemplary embodiments of this invention. In accordance with these exemplary embodiments a method performs, at Block 4A, a step of receiving information from a plurality of spatially distributed user devices, the information derived at least from observations of an environment of each user device. At Block 4B there is a step performed, based on the received information, creating a model of time evolution of a spatio-temporal map for a plurality of spatial locations. At Block 4C there is a step of creating a policy based on the model of time evolution of the spatio-temporal map. At Block 4D there is a step of transmitting the policy to the plurality of user devices.

In accordance with the method depicted in FIG. 4, where the information is received at at least one base station, and where the model is created at the at least one base station.

In accordance with the method depicted in FIG. 4, where the information is received at a plurality of base stations, and where the model is created at a wireless network node that is common to the plurality of base stations.

In accordance with the method depicted in FIG. 4, where the received information is comprised of at least one of a local interference level and a local cost for use of radio spectrum.

In accordance with the method depicted in FIG. 4, where the received information is further comprised of at least one of a current direction of movement of a user device, an expected future direction of movement of the user device, and a destination location of the user device.

In accordance with the method depicted in FIG. 4, where the received information is comprised of a current transmission state of the user device.

In accordance with the method depicted in FIG. 4, where the received information from a particular user device is based on a probabilistic model created at the particular user device.

In accordance with the method depicted in FIG. 4 and the preceding paragraph, where the probabilistic model is a hidden Markov model.

In accordance with the method depicted in FIG. 4 and the preceding paragraphs, where creating the model of time evolution of the spatio-temporal map comprises combining the probabilistic models received from the plurality of user devices.

In accordance with the method depicted in FIG. 4, where the model is used for predicting future values of the parameters at the spatial locations.

In accordance with the method depicted in FIG. 4 and the preceding paragraph, further comprising changing a spatial location of at least one base station in accordance with predicted future values.

In accordance with the method depicted in FIG. 4 and the preceding paragraphs, further comprising changing a transmit power level of at least one base station in accordance with predicted future values.

In accordance with the method depicted in FIG. 4 and the preceding paragraphs, where the policy is a joint policy shared between a plurality of base stations, and where a plurality of base stations autonomously change their respective transmit power levels based on the joint policy.

In accordance with the method depicted in FIG. 4, where the transmitted policy includes at least one reward or at least one penalty configured to influence at least one of the current operation of the user devices, the current movement of the user devices, the future operation of the user devices, and the future movement of the user devices.

In accordance with the method depicted in FIG. 4, where the transmitted policy is configured to influence a path taken by a user device between two spatial locations so as to at least one of reduce radio interference experienced by the user device, reduce radio connection cost for the user device, increase a likelihood of encountering a person or object, and increase a likelihood of avoiding a person or object, and where increasing the likelihood of encountering and avoiding can be based at least in part of parameters other than radio-related parameters that are observed by a user device.

In accordance with the method depicted in FIG. 4, where the transmitted policy is configured to influence a path taken by a user device between two spatial locations so as to at least reduce radio interference experienced by other user devices.

In accordance with the method depicted in FIG. 4, where the transmitted policy is configured to influence a choice of communication frequencies by the user devices.

In accordance with the method depicted in FIG. 4, where the transmitted policy is configured at least in part by using a partially observable Markov decision process model.

In accordance with the method depicted in FIG. 4, where the spatio-temporal map is comprised of radio-related parameters that comprise at least one of dynamic radio interference and static radio interference.

Figure 5:
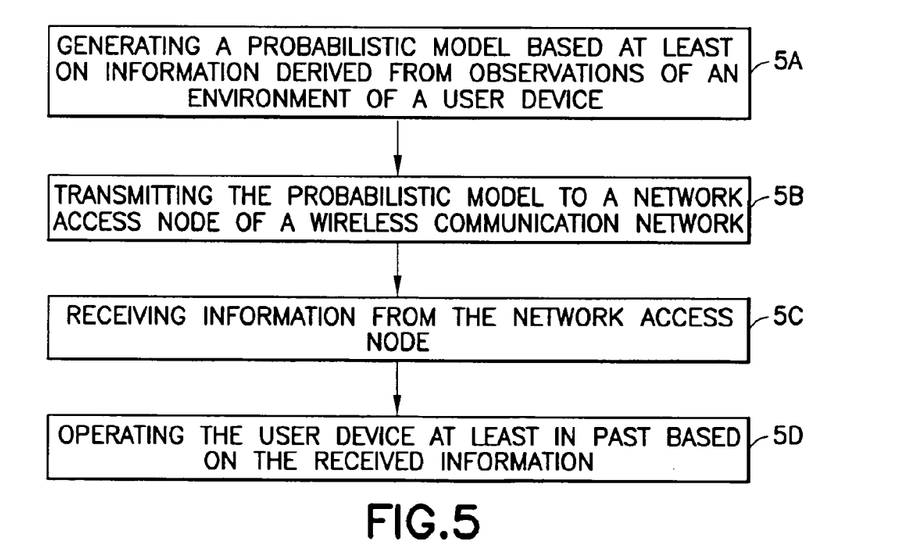
FIG. 5 is a logic flow diagram that illustrates the operation of a method, and a result of execution of computer program instructions embodied on a computer readable memory, further in accordance with the exemplary embodiments of this invention.

FIG. 5 is a logic flow diagram that illustrates the operation of a method, and a result of execution of computer program instructions, further in accordance with the exemplary embodiments of this invention. In accordance with these exemplary embodiments a method performs, at Block 5A, a step of generating a probabilistic model based at least on information derived from observations of an environment of a user device. At Block 5B there is a step of transmitting the probabilistic model to a network access node of a wireless communication network. At Block 5C there is a step of receiving information from the network access node. At Block 5D there is a step of operating the user device at least in part based on the received information.

In accordance with the method depicted in FIG. 5, where the observations are comprised of at least one of a local interference level and a local cost for use of radio spectrum.

In accordance with the method depicted in FIG. 5, where the probabilistic model comprises information related to at least one of a current direction of movement of the user device, an expected future direction of movement of the user device, and a destination location of the user device.

In accordance with the method depicted in FIG. 5, where the probabilistic model comprises information related to a transmission state of the user device.

In accordance with the method depicted in FIG. 5, where the probabilistic model is a hidden Markov model.

In accordance with the method depicted in FIG. 5, where the received information comprises at least one reward or at least one penalty configured to influence at least one of the current operation of the user device, the current movement of the user device, the future operation of the user device, and the future movement of the user device, and where the future movement can be configured to increase a likelihood of encountering a person or object, increase a likelihood of avoiding a person or object, and where increasing the likelihood of encountering and avoiding can be based at least in part on parameters other than radio-related parameters that are observed by the user device.

In accordance with the method depicted in FIG. 5, where the received information influences a path taken by the user device between two spatial locations so as to at least one of reduce radio interference experienced by the user device, reduce radio connection cost for the user device, reduce radio interference experienced by other user devices, and influence a choice of communication frequencies by the user device.

The exemplary embodiments also encompass a non-transitory computer-readable medium that contains software program instructions, where execution of the software program instructions by at least one data processor results in performance of operations that comprise execution of the methods shown in FIGS. 4 and 5 and the various paragraphs descriptive of the methods shown in FIGS. 4 and 5.

The various blocks shown in FIGS. 4 and 5 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

The exemplary embodiments thus also encompass an apparatus that comprises at least one processor and at least one memory including computer program code. The memory and computer program code are configured to, with the at least one processor, cause the apparatus at least to receive information from a plurality of spatially distributed user devices, the information comprising at least observations of a radio environment of each user device; to create, based on the received information, a model of time evolution of a spatio-temporal map for a plurality of spatial locations; to create a policy based on the model of time evolution of the spatio-temporal map; and to transmit the policy to the plurality of user devices.

The exemplary embodiments thus also encompass an apparatus that comprises means for receiving information (e.g., transceiver 12D) from a plurality of spatially distributed user devices, the information comprising at least observations of a radio environment of each user device; means, responsive to the received information, for creating a model of time evolution of a spatio-temporal map (e.g., data processor 12A in combination with memory 12B and program 12C) for a plurality of spatial locations; means for creating a policy based on the model of time evolution of the spatio-temporal map (e.g., data processor 12A in combination with memory 12B and program 12C); and means for transmitting (e.g., transceiver 12A) the policy to the plurality of user devices.

The exemplary embodiments thus also encompass an apparatus that comprises at least one processor and at least one memory including computer program code. The memory and computer program code are configured to, with the at least one processor, cause the apparatus at least to generate a probabilistic model based at least on observations of a radio environment of a user device; transmit the probabilistic model to a network access node of a wireless communication network; receive information from the network access node and operate the user device at least in part based on the received information.

The exemplary embodiments thus pertain to an apparatus that comprises means for generating (e.g., data processor 10A in combination with memory 10B and program 10C) a probabilistic model based at least on observations of a radio environment of a user device; means for transmitting (e.g., transceiver 10D) the probabilistic model to a network access node of a wireless communication network; means for receiving (e.g., transceiver 10D) information from the network access node; and means for operating (e.g., data processor 10A in combination with memory 10B and program 10C) the user device at least in part based on the received information.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be appreciated that the exemplary embodiments of this invention are not limited for use with any one type of wireless communication system, and that they may be used to advantage in various types of wireless communication systems and with combinations of different types of wireless communications systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

The exemplary embodiments of this invention are not limited for use with only the various algorithms (e.g., HMM, Baum-Welch, POMDP) that were referred to above. These are merely examples of suitable algorithms.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   receiving information from a plurality of spatially distributed user devices, the information derived at least from observations of an environment of each user device;
   based on the received information, creating a model of time evolution of a spatio-temporal map for a plurality of spatial locations;
   creating a policy based on the model of time evolution of the spatio-temporal map; and
   transmitting the policy to the plurality of user devices;
   where the transmitted policy includes at least one reward or at least one penalty configured to influence at least one of the current operation of the user devices, the current movement of the user devices, the future operation of the user devices, and the future movement of the user devices.

2. The method of claim 1, where the information is received at at least one base station, and where the model is created at the at least one base station.

3. The method of claim 1, where the information is received at a plurality of base stations, and where the model is created at a wireless network node that is common to the plurality of base stations.

4. The method of claim 1, where the received information is comprised of at least one of a local interference level and a local cost for use of radio spectrum, at least one of a current direction of movement of a user device, an expected future direction of movement of the user device, and a destination location of the user device, a current transmission state of the user device.

5. The method of claim 1, where the received information from a particular user device is based on a probabilistic model created at the particular user device, where creating the model of time evolution of the spatio-temporal map comprises combining the probabilistic models received from the plurality of user devices.

6. The method of claim 1, where the model is used for predicting future values of the parameters at the spatial locations, further comprising changing at least one of a spatial location of at least one base station in accordance with predicted future values and a transmit power level of at least one base station in accordance with predicted future values.

7. The method of claim 1, where the transmitted policy is configured to influence a path taken by a user device between two spatial locations so as to at least one of reduce radio interference experienced by the user device, reduce radio interference experienced by other user devices, reduce radio connection cost for the user device, influence a choice of communication frequencies by the user devices, increase a likelihood of encountering a person or object, and increase a likelihood of avoiding a person or object, and where increasing the likelihood of encountering and avoiding can be based at least in part on parameters other than radio-related parameters that are observed by a user device.

8. The method of claim 1, where the spatio-temporal map comprises radio-related parameters that comprise at least one of dynamic radio interference and static radio interference.

9. A non-transitory computer-readable medium that contains software program instructions, where execution of the software program instructions by at least one data processor results in performance of operations that comprise execution of the method of claim 1.

10. An apparatus, comprising:
at least one processor; and
at least one memory including computer program code, where the at least one memory and computer program code are configured to, with the at least one processor, cause the apparatus at least to receive information from a plurality of spatially distributed user devices, the information derived at least from observations of an environment of each user device; to create, based on the received information, a model of time evolution of a spatio-temporal map for a plurality of spatial locations; to create a policy based on the model of time evolution of the spatio-temporal map; and to transmit the policy to the plurality of user devices;
where the transmitted policy includes at least one reward or at least one penalty configured to influence at least one of the current operation of the user devices, the current movement of the user devices, the future operation of the user devices, and the future movement of the user devices.

11. The apparatus of claim 10, where the information is received at at least one base station, and where the model is created at one of the at least one base station and a wireless network node that is common to a plurality of base stations.

12. The apparatus of claim 10, where the received information is comprised of at least one of a local interference level and a local cost for use of radio spectrum, at least one of a current direction of movement of a user device, an expected future direction of movement of the user device, and a destination location of the user device, a current transmission state of the user device.

13. The apparatus of claim 10, where the received information from a particular user device is based on a probabilistic model created at the particular user device, and where creating the model of time evolution of the spatio-temporal map comprises combining the probabilistic models received from the plurality of user devices.

14. The apparatus of claim 10, where the model is used for predicting future values of the parameters at the spatial locations enabling at least one of a spatial location of at least one base station to be changed in accordance with predicted future values and a transmit power level of at least one base station to be changed in accordance with predicted future values.

15. The apparatus of claim 10, where the transmitted policy is configured to influence a path taken by a user device between two spatial locations so as to at least one of reduce radio interference experienced by the user device, reduce radio interference experienced by other user devices, reduce radio connection cost for the user device, influence a choice of communication frequencies by the user devices, increase a likelihood of encountering a person or object, and increase a likelihood of avoiding a person or object, and where increasing the likelihood of encountering and avoiding can be based at least in part of parameters other than radio-related parameters that are observed by a user device.

16. The apparatus of claim 10, where the spatio-temporal map comprises radio-related parameters that comprise at least one of dynamic radio interference and static radio interference.

17. A method comprising:
generating a probabilistic model based at least on information derived from observations of an environment of a user device;
transmitting the probabilistic model to a network access node of a wireless communication network;
receiving information from the network access node; and
operating the user device at least in part based on the received information;
where the received information comprises at least one reward or at least one penalty configured to influence at least one of the current operation of the user device, the current movement of the user device, the future operation of the user device, and the future movement of the user device.

18. The method of claim 17, where the observations are comprised of at least one of a local interference level and a local cost for use of radio spectrum, where the probabilistic model comprises information related to at least one of a current direction of movement of the user device, an expected future direction of movement of the user device, a destination location of the user device and a transmission state of the user device.

19. The method of claim 17, where the future movement can be configured to increase a likelihood of encountering a person or object, increase a likelihood of avoiding a person or object, and where increasing the likelihood of encountering and avoiding can be based at least in part on parameters other than radio-related parameters that are observed by the user device, and where the received information is configured to influence a path taken by the user device between two spatial locations so as to at least one of reduce radio interference experienced by the user device, reduce radio connection cost for the user device, reduce radio interference experienced by other user devices, and influence a choice of communication frequencies by the user device.

* * * * *